United States Patent
Jige et al.

(12) United States Patent (10) Patent No.: US 6,620,213 B2
Jige et al. (45) Date of Patent: Sep. 16, 2003

(54) METHOD FOR MANUFACTURING ELECTRODE PLATE FOR BATTERY

(75) Inventors: Shinichi Jige, Shizuoka (JP); Jun Matsumura, Shiga (JP); Hisao Matsutomi, Osaka (JP); Mitsugu Takaki, Aichi (JP); Hiroshi Yoshida, Aichi (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 205 days.

(21) Appl. No.: 09/850,791

(22) Filed: May 8, 2001

(65) Prior Publication Data

US 2002/0013998 A1 Feb. 7, 2002

(30) Foreign Application Priority Data

May 10, 2000 (JP) ........................................ 2000-137294

(51) Int. Cl.[7] ................................................ H01M 4/04
(52) U.S. Cl. ...................... 29/623.5; 29/623.1; 83/679; 141/1.1
(58) Field of Search .............................. 83/679, 699.11, 83/929.1; 29/623.5, 623.1; 141/1.1

(56) References Cited

U.S. PATENT DOCUMENTS 5,005,456 A * 4/1991 Ballard et al.
2002/0146623 A1 * 10/2002 Suzuki et al. ............ 429/218.1

FOREIGN PATENT DOCUMENTS

JP 6-262272 9/1994
JP 8-45500 2/1996

* cited by examiner

*Primary Examiner*—John S. Maples
(74) *Attorney, Agent, or Firm*—Merchant & Gould, P.C.

(57) ABSTRACT

A method for manufacturing an electrode plate for a battery includes the following: the regions on both sides of and close to a portion of an electrode sheet to be cut are each fixed between the cutting edges of a pair of upper and lower cutting dies, i.e., the cutting edges of the adjacent cutting dies are in contact with only the regions on both sides of and close to the portion to be cut; two adjacent pairs of upper and lower cutting dies on both sides of the portion to be cut are moved in opposite directions (upward and downward), and thus the electrode sheet is cut at the portion to be cut, resulting in nickel electrode plates having a width of 50 mm and length of 100 mm. This method can suppress the adhesion of fragments to the electrode plate surface and the generation of burrs, thereby reducing the short-circuit failure between the electrode plates incorporated into a battery.

9 Claims, 5 Drawing Sheets

METHOD FOR MANUFACTURING ELECTRODE PLATE FOR BATTERY

BACKGROUND OF THE INVENTION

1. Field of the Invention

The present invention relates to a method for manufacturing an electrode plate for a battery. More specifically, the present invention relates to a method for manufacturing an electrode plate for a battery that can reduce the short-circuit failure between electrode plates after incorporation into a battery.

2. Description of the Related Art

In recent years, global warming and the exhaustion of resources, such as fossil fuel, have been serious problems. To deal with these problems, electric vehicles, including pure electric vehicles powered by a battery alone and hybrid electric vehicles powered by a battery and gasoline, have begun to spread and take the place of gasoline-powered vehicles. At present, a nickel metal-hydride storage battery is used as a driving power source for these electric vehicles. The market for the electric vehicles employing such a nickel metal-hydride storage battery or lithium ion secondary battery as a driving power source is expected to expand in the future.

An electrode plate used in these batteries is provided by cutting a flat electrode sheet to a predetermined size. The following is a conventional method for cutting an electrode plate for a battery: as shown in FIGS. 4 and 5, the entire regions on both sides of a portion to be cut 4 of an electrode sheet 3 are each fixed between a pair of upper and lower flat cutting dies 6 having the same area as an electrode plate; two adjacent pairs of upper and lower cutting dies 6 on both sides of the portion to be cut 4 are moved perpendicularly to the electrode sheet 3 in opposite directions (upward and downward), and thus the electrode sheet 3 is cut to a predetermined size. Moreover, to suppress burrs that are generated on the electrode plate after cutting, a method for reducing the thickness of the portion of the electrode sheet to be cut has been proposed as well.

However, the above conventional cutting method causes the adhesion of foreign materials to the electrode plate surface and an edge burr, which are largely responsible for the short-circuit failure between electrode plates after incorporation into a battery. The adhesion of foreign materials to the electrode plate surface occurs because fragments are pressed on the electrode plate surface by the cutting dies when the electrode sheet is cut with the adjacent flat cutting dies being in contact with the entire regions on both sides of the portion to be cut. Also, the edge burr is generated when the flat electrode sheet is cut. Moreover, even if the portion of the electrode sheet to be cut is thin, the edge burr occurs because the thin portion is bent during cutting and the burrs are not suppressed completely.

SUMMARY OF THE INVENTION

Therefore, with the foregoing in mind, it is an object of the present invention to provide a method for manufacturing an electrode plate for a battery that can reduce the short-circuit failure between electrode plates after incorporation into a battery by suppressing the adhesion of fragments to the electrode plate surface and the generation of burrs.

To achieve the above object, a method for manufacturing an electrode plate for a battery of the present invention includes cutting an electrode sheet containing an active material to a predetermined size with cutting dies. The regions on both sides of and close to a portion of the electrode sheet to be cut are each fixed between a pair of cutting dies. Two adjacent pairs of cutting dies on both sides of the portion to be cut are moved perpendicularly to the electrode sheet in opposite directions to each other, and thus the electrode sheet is cut. This method can lower the frequency with which fragments produced in cutting the electrode sheet are pressed on the electrode plate surface by the cutting dies, thus reducing the adhesion of foreign materials to the electrode plate surface. As a result, the short-circuit failure between electrode plates can be reduced after the electrode group produced in the above manner has been incorporated into a battery. Here, "the region close to a portion to be cut", in this context, refers to the region within about one-tenth of the width and one-twentieth of the length of the electrode plate cut (hereinafter, used in the same way).

In the above method of the present invention, it is preferable that the portion of the electrode sheet to be cut and the regions on both sides of and close to that portion are formed previously so as to have a thickness smaller than that of the electrode sheet body, and when the electrode sheet is cut, the thin regions on both sides of the portion to be cut are each fixed between a pair of cutting dies. This preferred example can reduce the adhesion of foreign materials on the electrode plate surface and prevent burrs from being generated on the electrode surface as well. The reason for this is as follows: since a three-dimensional porous metal substrate is in sponge form, it is hardened by reducing the thickness; in addition, a surface burr (the height of a burr from the electrode plate surface) tends to be higher with increasing thickness of the substrate. Thus, the short-circuit failure between electrode plates can be reduced further after the electrode group produced in the above manner has been incorporated into a battery. In this case, it is preferable that the thickness of the thin region is one-half to one-fifth of that of the electrode sheet body. Though the burrs are not generated readily with reducing the thickness of the substrate, an excessive reduction in thickness makes cutting difficult. Moreover, in this case, it is preferable that the portion of the electrode sheet to be cut and the regions on both sides of and close to that portion are formed to be thin by pressing.

In the above method of the present invention, it is preferable that the electrode sheet is formed by filling a substrate of three-dimensional porous metal body with the active material.

In the above method of the present invention, it is preferable that the electrode sheet is formed by filling a substrate of three-dimensional porous metal body with the active material, and that the regions on both sides of and close to the portion of the electrode sheet to be cut are coated with resin or impregnated with a liquid containing a resin component before cutting the electrode sheet. This preferred example can reduce the adhesion of foreign materials to the electrode plate surface and prevent burrs from being generated on the electrode plate surface as well. Moreover, in this case, it is preferable that the method includes the following steps in no special order before cutting the electrode sheet: a step of coating the regions on both sides of and close to the portion of the electrode sheet to be cut with resin or a step of impregnating the regions with a liquid containing a resin component, and a step of forming the portion of the electrode sheet to be cut and the regions on both sides of and close to that portion so as to have a thickness smaller than that of the electrode sheet body. This preferred example further can reduce the adhesion of foreign materials to the electrode plate surface and prevent burrs from being generated on the electrode plate surface as well.

In the above method of the present invention, it is preferable that the electrode sheet is formed by applying the active material to a core material of punching metal, that a region to which no active material is applied is provided previously in the portion of the electrode sheet to be cut and the regions on both sides of and close to that portion, and when the electrode sheet is cut, the regions with no active material on both sides of the portion to be cut are each fixed between a pair of cutting dies. This preferred example can reduce the adhesion of foreign materials to the electrode plate surface. In addition, since a plain region is cut, burrs generated on the electrode plate surface can be prevented as well. Thus, the short-circuit failure between electrode plates further can be reduced after the electrode group produced in the above manner has been incorporated into a battery.

As described above, the present invention can prevent fragments of the electrode sheet from being pressed on the electrode plate surface to form foreign materials thereon and burrs from being generated on the electrode plate surface. Thus, the short circuits of the electrode group for a battery can be suppressed.

These and other advantages of the present invention will become apparent to those skilled in the art upon reading and understanding the following detailed description with reference to the accompanying figures.

DESCRIPTION OF THE PREFERRED EMBODIMENTS

Figure 1:
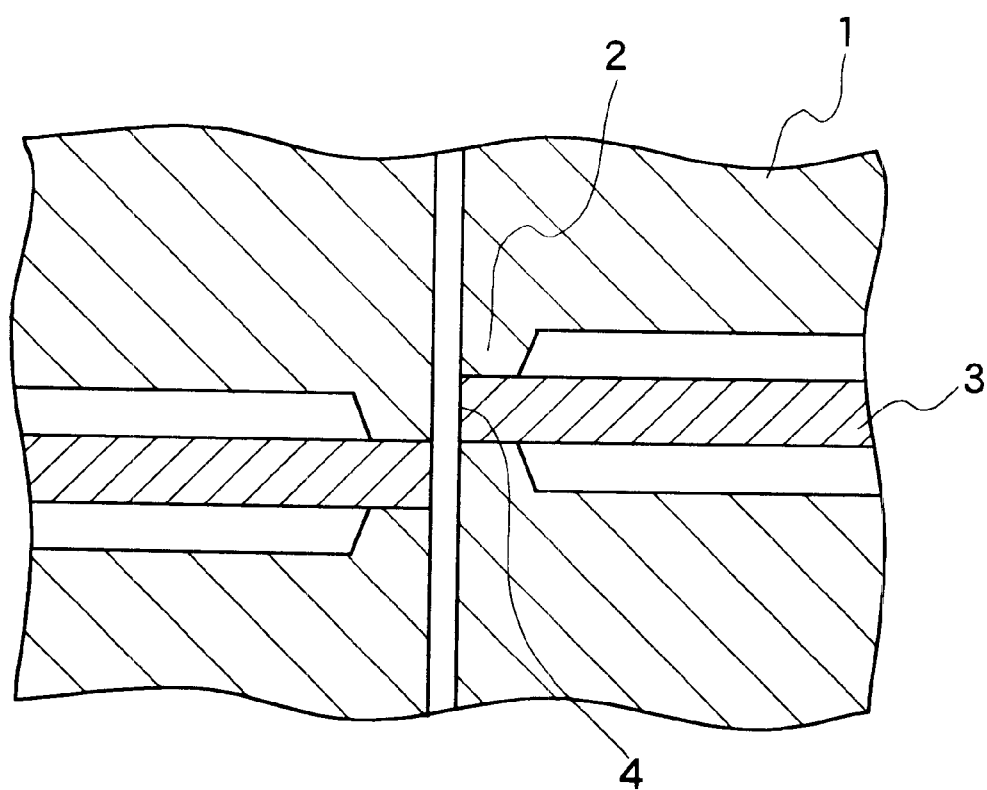
FIG. 1 is a schematic cross-sectional view showing an electrode sheet and cutting dies used in an embodiment of the present invention.

Hereinafter, the present invention will be described more specifically with reference to an embodiment.

A method for manufacturing an electrode plate for a battery of the present invention is such that an electrode sheet containing an active material is cut to a predetermined size with cutting dies, resulting in an electrode plate for a battery. In this case, the regions on both sides of and close to a portion of the electrode sheet to be cut are each fixed between the cutting edges of a pair of upper and lower cutting dies. Then, two adjacent pairs of upper and lower cutting dies on both sides of the portion to be cut are moved perpendicularly to the electrode sheet in opposite directions (upward and downward). Thus, the electrode sheet is cut.

This cutting method can lower the frequency with which fragments produced in cutting the electrode sheet are pressed on the electrode plate surface by the cutting dies, thus reducing the adhesion of foreign materials to the electrode plate surface. As a result, the short-circuit failure between electrode plates can be reduced after the electrode group produced in the above manner has been incorporated into a battery.

In the present invention, it is desirable that the portion of the electrode sheet to be cut and the regions on both sides of and close to that portion are formed previously so as to have a thickness smaller than that of the electrode sheet body, and when the electrode sheet is cut, the thin regions on both sides of the portion to be cut are each fixed between a pair of cutting dies. This cutting method can reduce the adhesion of foreign materials to the electrode plate surface and prevent burrs from being generated on the electrode plate surface as well. Thus, the short-circuit failure between electrode plates further can be reduced after the electrode group produced in the above manner has been incorporated into a battery.

Since the burrs generated in cutting the electrode sheet are increased in proportion to the thickness of the electrode sheet around the portion to be cut, it is desirable that the portion of the electrode sheet to be cut and the regions on both sides of and close to that portion have a thickness smaller than that of the electrode sheet body, and more desirably, the thickness is about one-half to one-fifth of that of the electrode sheet body.

In the present invention, it is desirable that the regions on both sides of and close to the portion of the electrode sheet to be cut are coated with resin beforehand. This can prevent needle-shaped burrs from being generated at the ends of a cutting plane. Even if such burrs are caused, the short-circuit failure between electrode plates can be reduced after the electrode group has been incorporated into a battery because the ends of the burrs are covered with insulating resin.

In this case, as a method for resin coating, it is easy to weld a resin film. However, a hot-melt adhesive may be applied.

In the present invention, it is desirable that the regions on both sides of and close to the portion of the electrode sheet to be cut are impregnated with a liquid containing a resin component beforehand. This allows the skeleton metal, which is located on both sides of and close to the portion to be cut, to be bonded or coated with resin, thereby preventing the needle-shaped burrs or sharpened fragments during cutting. As a method for impregnating a liquid containing a resin component, a liquid in which a resin component is dissolved or dispersed, having a relatively low viscosity, may be applied or sprayed.

In the present invention, it is desirable to perform the following steps in no special order before cutting the electrode sheet: a step of coating the regions on both sides of and close to the portion of the electrode sheet to be cut with resin or a step of impregnating the regions with a liquid containing a resin component (a resin solution), and a step of forming the portion of the electrode sheet to be cut and the regions on both sides of and close to that portion so as to have a thickness smaller than that of the electrode sheet body. This method allows the skeleton metal, which is located on both sides of and close to the portion to be cut, to be bonded more firmly and shaped to be thinner by pressing. In addition, this portion is coated with insulating resin. As a result, the generation of needle-shaped burrs and the adhesion of sharpened fragments or dropped active material to the electrode plate surface can be prevented.

In the present invention, it is desirable that the electrode sheet is formed by applying the active material to a core material of punching metal, that a region to which no active material is applied (a plain region) is provided previously in the portion of the electrode sheet to be cut and the regions on both sides of and close to that portion, and when the electrode sheet is cut, the plain regions on both sides of the portion to be cut are each fixed between a pair of upper and lower cutting dies. This cutting method can reduce the adhesion of foreign materials to the electrode plate surface. In addition, since the plain region is cut, the burrs generated on the electrode plate surface can be prevented as well. Consequently, the short-circuit failure between electrode plates further can be reduced after the electrode group produced in the above manner has been incorporated into a battery.

Hereinafter, the present invention will be described in further detail by way of specific examples.

EXAMPLE 1

Figure 2:
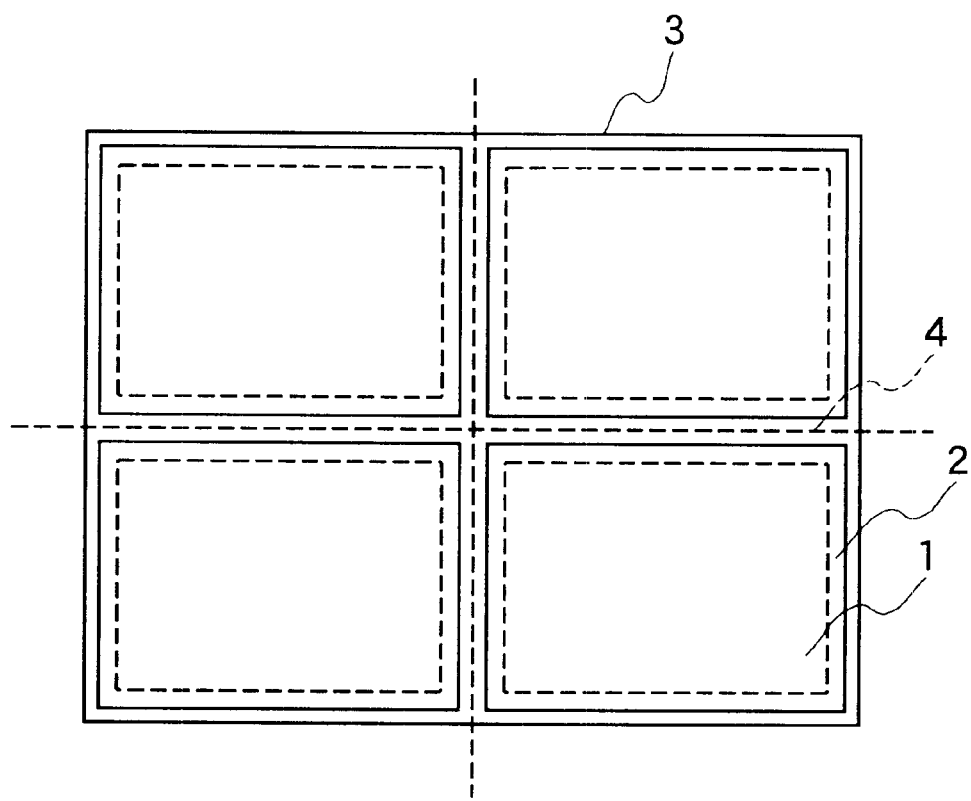
FIG. 2 is a schematic plan view showing an electrode sheet and cutting dies used in an embodiment of the present invention.

FIG. 1 is a schematic cross-sectional view showing an electrode sheet and cutting dies used in this example; FIG. 2 is a schematic plan view showing the same.

In FIGS. 1 and 2, numeral 1 indicates a pair of upper and lower cutting dies. Numeral 3 is an electrode sheet, and a pair of upper and lower cutting dies 1 is placed on both sides of a portion to be cut 4 of the electrode sheet 3. Each of the upper and lower cutting dies 1 has a cutting edge 2 that is provided around the periphery of an electrode plate. When the electrode sheet 3 is cut, the regions on both sides of and close to the portion to be cut 4 of the electrode sheet 3 are each fixed between a pair of upper and lower cutting edges 2. Here, a width of the cutting edge 2 of the cutting die 1 is 1.0±0.5 mm.

Hereinafter, a method for manufacturing an electrode plate using the cutting dies with the above configuration will be described.

First, 100 parts by weight of nickel hydroxide was mixed with 10 parts by weight of nickel metal powder and 5 parts by weight of cobalt oxide powder. To this was added water as a dispersion medium so as to account for 30 weight % of the total paste, which then was kneaded into an active material in paste form.

The paste active material thus prepared was placed in a tank. A filling nozzle connected to the tank was opposed to a spongy three-dimensional porous nickel metal body to be filled with the paste active material. The spongy three-dimensional porous nickel metal body was belt-shaped, having a width of 110 mm, length of 210 mm, thickness of 1.0 mm, porosity of 98%, and average pore size of 100 $\mu$m. In this case, the filling nozzle delivered a certain amount of active material, 9 to 10 g/sheet, to fill the spongy porous nickel metal body. Thereafter, the spongy porous nickel metal body was pressed so that the whole thickness was 0.50 mm, resulting in the electrode sheet 3 (see FIG. 1).

Next, as shown in FIGS. 1 and 2, the regions on both sides of and close to the portion to be cut 4 of the electrode sheet 3 were each fixed between the cutting edges 2 of a pair of upper and lower cutting dies 1, i.e., the cutting edges 2 of the adjacent cutting dies 1 were in contact with only the regions on both sides of and close to the portion to be cut 4. Then, two adjacent pairs of upper and lower cutting dies 1 on both sides of the portion to be cut 4 were moved perpendicularly to the electrode sheet 3 in opposite directions (upward and downward). Thus, the electrode sheet 3 was cut at the portion to be cut 4, resulting in nickel electrode plates having a width of 50 mm and length of 100 mm.

Three nickel electrode plates thus provided, a known separator, and four known negative electrode plates made of misch metal-nickel based hydrogen storage alloy were used to produce an electrode group.

Short-circuit tests were conducted on the electrode group by measuring its resistance under a load of 300 kg·f (2,940N), which was substantially equal to the pressure to which the electrode group was subjected when it was incorporated into a battery. For Comparative Example 1, the same short-circuit tests were conducted on an electrode group having the same configuration as that in this example, except for the use of nickel electrode plates provided in the following manner: the entire regions on both sides of a portion to be cut 4 of an electrode sheet 3 were each fixed between a pair of upper and lower flat cutting dies 6 having the same area as an electrode plate, i.e., the adjacent flat cutting dies were in contact with the entire regions on both sides of the portion to be cut 4; two adjacent pairs of upper and lower cutting dies on both sides of the portion to be cut 4 were moved perpendicularly to the electrode sheet 3 in opposite directions (upward and downward), and thus the electrode sheet 3 was cut. The following Table 1 shows the difference in frequency of short circuits between the electrode group including the nickel electrode plates manufactured by a method of this example and that including the nickel electrode plates manufactured by a method of Comparative Example 1.

TABLE 1

|  | Number of electrode groups tested | Number of electrode groups short-circuited | Proportion of short circuits (%) |
| --- | --- | --- | --- |
| Example 1 | 10,000 | 40 | 0.4 |
| Comparative Example 1 | 10,000 | 120 | 1.2 |

As can be seen from Table 1, the short-circuit frequency of the electrode group including the nickel electrode plates of Comparative Example 1 was 1.2%. On the other hand, the short-circuit frequency of the electrode group including the nickel electrode plates of this example was reduced to 0.4%. The reason for this was to be considered as follows: When the electrode sheet 3 was cut with the adjacent cutting dies being in contact with the entire regions on both sides of the portion to be cut 4, like Comparative Example 1, fragments produced in cutting the electrode sheet 3 were pressed on the surface of a nickel electrode plate by the cutting dies. This led to foreign materials on the electrode plate surface, causing the short circuits between the electrode plates. However, when the electrode sheet 3 was cut with the cutting edges 2 of the adjacent cutting dies 1 being in contact with only the regions on both sides of and close to the portion to be cut 4, like this example, the frequency with which fragments were pressed on the surface of a nickel electrode plate by the cutting dies 1 was lowered, thus reducing the adhesion of foreign materials to the nickel electrode plate surface.

EXAMPLE 2

Figure 3:
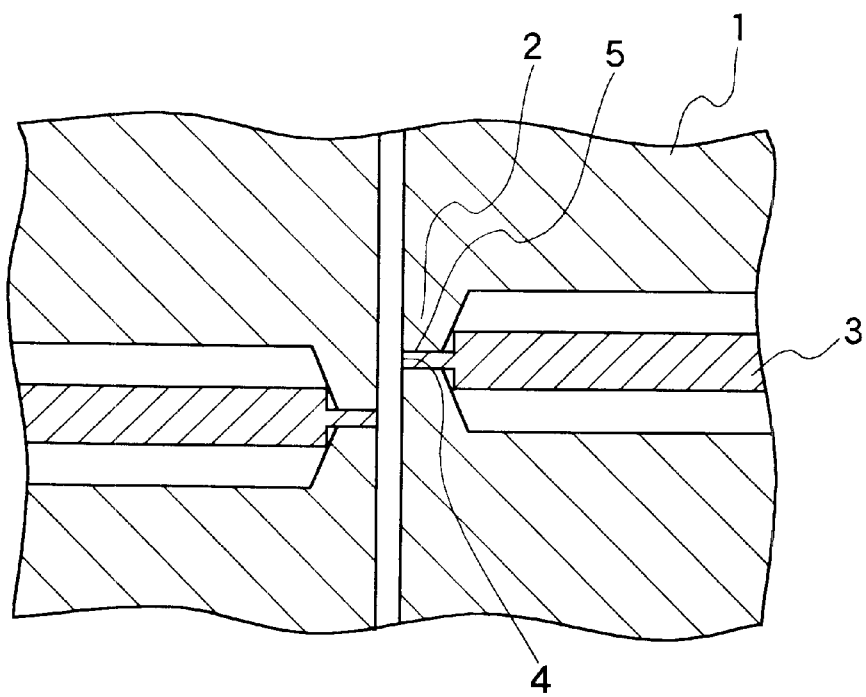
FIG. 3 is a schematic cross-sectional view showing another electrode sheet and cutting dies used in an embodiment of the present invention.
Figure 4:
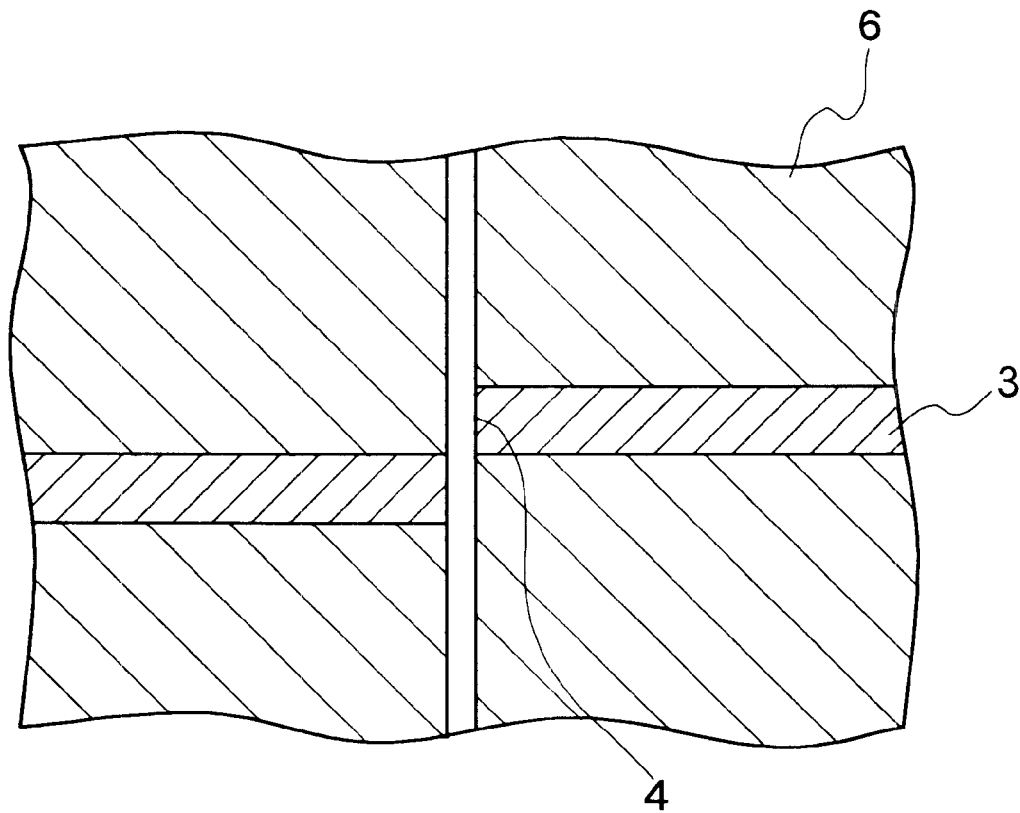
FIG. 4 is a schematic cross-sectional view showing an electrode sheet and cutting dies used in the prior art.
Figure 5:
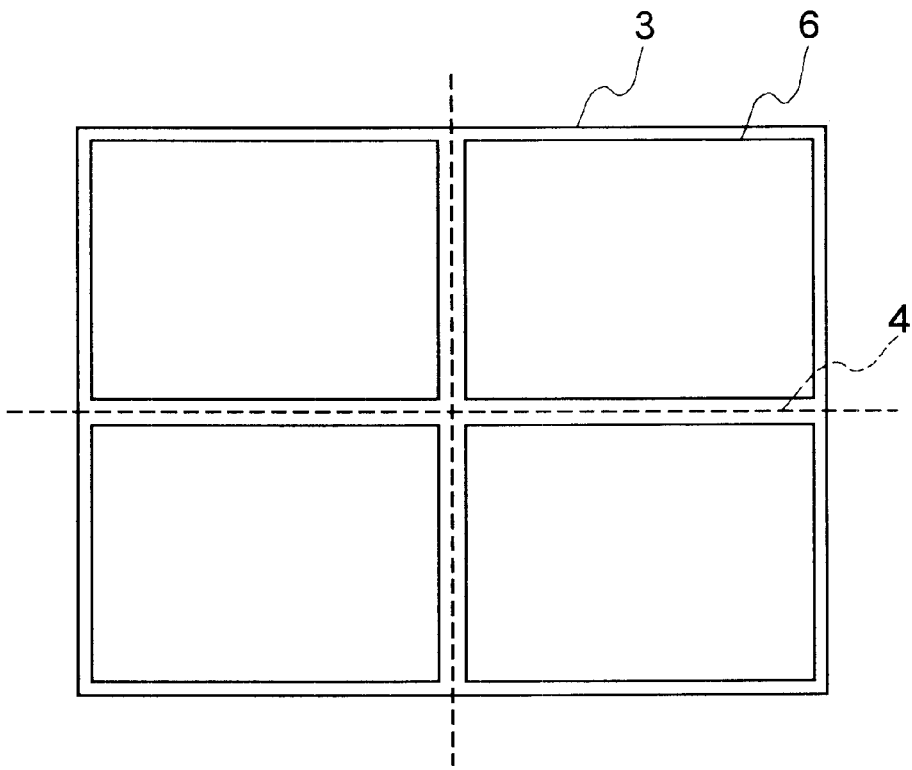
FIG. 5 is a schematic plan view showing an electrode sheet and cutting dies used in the prior art.

FIG. 3 is a schematic cross-sectional view showing an electrode sheet and cutting dies used in this example.

In FIGS. 2 and 3, numeral 1 indicates a pair of upper and lower cutting dies. Numeral 3 is an electrode sheet, and a pair of upper and lower cutting dies 1 is placed on both sides of a portion to be cut 4 of the electrode sheet 3. The portion to be cut 4 of the electrode sheet 3 and its periphery is formed into a thin region 5, having a thickness smaller than that of the electrode sheet body. Each of the upper and lower cutting dies 1 has a cutting edge 2 that is provided around the periphery of an electrode plate. When the electrode sheet 3 is cut, the thin regions 5 on both sides of the portion to be cut 4 of the electrode sheet 3 are each fixed between a pair of upper and lower cutting edges 2.

Hereinafter, a method for manufacturing an electrode plate using the cutting dies with the above configuration will be described.

In this example, a spongy porous nickel metal body with the same size as that in Example 1 was formed so as to have the thin region 5 corresponding to the portion to be cut 4 of the electrode sheet 3 and its periphery by a rolling die. The thin region 5 was 2.0 mm wide and 0.20 mm thick.

Then, like Example 1, the spongy porous nickel metal body was filled with a paste active material, which then was pressed so that the whole thickness (except the thin region) was 0.50 mm, resulting in the electrode sheet 3.

Next, as shown in FIGS. 2 and 3, the thin regions 5 on both sides of the portion to be cut 4 of the electrode sheet 3 were each fixed between the cutting edges 2 of a pair of upper and lower cutting dies 1, i.e., the cutting edges 2 of the adjacent cutting dies 1 were in contact with only the thin regions 5 on both sides of the portion to be cut 4. Then, two adjacent pairs of upper and lower cutting dies 1 on both sides of the portion to be cut 4 were moved perpendicularly to the electrode sheet 3 in opposite directions (upward and downward). Thus, the electrode sheet 3 was cut at the portion to be cut 4, resulting in nickel electrode plates having a width of 50 mm and length of 100 mm. As with Example 1, the nickel electrode plates thus provided, a known separator, and known negative electrode plates made of misch metal-nickel based hydrogen storage alloy were used to produce an electrode group.

Short-circuit tests were conducted on the electrode group by measuring its resistance under a load of 300 kg·f (2,940N). For Comparative Example 2, the same short-circuit tests were conducted on an electrode group produced in the same manner as this example. The electrode group included the nickel electrode plates provided in the following manner: an electrode sheet 3 was prepared using a spongy porous nickel metal body with a thin region 5; the entire regions on both sides of a portion to be cut 4 of the electrode sheet 3 were each fixed between a pair of upper and lower flat cutting dies, i.e., the adjacent flat cutting dies were in contact with the entire regions on both sides of the portion to be cut 4; two adjacent pairs of upper and lower cutting dies on both sides of the portion to be cut 4 were moved perpendicularly to the electrode sheet 3 in opposite directions (upward and downward), and thus the electrode sheet 3 was cut. Moreover, for Comparative Example 3, the same short-circuit tests were conducted on an electrode group produced in the same manner as this example. The electrode group included the nickel electrode plates provided in the following manner: an electrode sheet 3 was prepared using a spongy porous nickel metal body without a thin region 5; the entire regions on both sides of a portion to be cut 4 of the electrode sheet 3 were each fixed between a pair of upper and lower flat cutting dies having the same area as an electrode plate, i.e., the adjacent flat cutting dies were in contact with the entire regions on both sides of the portion to be cut 4; two adjacent pairs of upper and lower cutting dies on both sides of the portion to be cut 4 were moved perpendicularly to the electrode sheet 3 in opposite directions (upward and downward), and thus the electrode sheet 3 was cut. The following Table 2 shows the difference in frequency of short circuits between the electrode group including the nickel electrode plates manufactured by a method of this example, that including the nickel electrode plates manufactured by a method of Comparative Example 2, and that including the nickel electrode plates manufactured by a method of Comparative Example 3.

TABLE 2

|  | Cutting portion thickness (mm) | Electrode sheet thickness (mm) | Number of electrode groups tested | Number of electrode groups short-circuited | Proportion of short circuits (%) |
| --- | --- | --- | --- | --- | --- |
| Example 2 | 0.20 | 0.50 | 10,000 | 10 | 0.1 |
| Comparative Example 2 | 0.2 | 0.50 | 10,000 | 80 | 0.8 |
| Comparative Example 3 | 0.50 | 0.50 | 10,000 | 120 | 1.2 |

As can be seen from Table 2, the short-circuit frequency of the electrode group including the nickel electrode plates of Comparative Example 3 was 1.2%, and that of Comparative Example 2 was 0.8%. On the other hand, the short-circuit frequency of the electrode group including the nickel electrode plates of this example was reduced to 0.1%. The reason for this was considered to be as follows: When the electrode sheet 3 was cut with the adjacent cutting dies being in contact with the entire regions on both sides of the portion to be cut 4, like Comparative Example 3, fragments produced in cutting the electrode sheet 3 were pressed on the surface of a nickel electrode plate by the cutting dies. This led to foreign materials on the electrode plate surface, causing the short circuits of the electrode group. Also, even if the spongy porous nickel metal body with the thin region 5 was used for the electrode sheet 3, like Comparative Example 2, the same phenomena occurred: when the electrode sheet 3 was cut with the adjacent cutting dies being in contact with the entire regions on both sides of the portion to be cut 4, though the burrs on the surface of a nickel electrode plate were reduced, fragments produced in cutting the electrode sheet 3 were pressed on the nickel electrode plate surface by the cutting dies. However, in this example, the spongy porous nickel metal body with the thin region 5 was used for the electrode sheet 3, and the electrode sheet 3 was cut with the cutting edges 2 of the adjacent cutting dies 1 being in contact with only the regions on both sides of and close to the portion to be cut 4. Thus, the frequency with which fragments were pressed on the nickel electrode plate surface by the cutting dies 1 was lowered, thereby reducing the adhesion of foreign materials to the nickel electrode plate surface as well as preventing burrs from being generated thereon.

In this example, the spongy porous nickel metal body was formed so as to have the thin region 5 corresponding to the portion to be cut 4 of the electrode sheet 3 and its periphery beforehand, and then filled with the paste active material. However, nearly the same effect was able to be obtained with the electrode sheet 3 that was provided in such a manner that the spongy porous nickel metal body was filled with the paste active material, and then formed so as to have the thin region 5 by pressing.

EXAMPLE 3

In this example, the same spongy three-dimensional porous nickel metal body as that in Example 1 was used as a substrate, which was filled with an active material in the same manner as Example 1. Then, a resin film made of polyethylene-polyvinyl alcohol copolymer, having a width of 5 mm and thickness of 0.2 mm, was welded on the portions on both faces of the substrate to be cut at a temperature of 90° C. The substrate was pressed so that the whole thickness was 0.5 mm, resulting in an electrode sheet 3.

Next, the regions on both sides of and close to a portion to be cut 4 of the electrode sheet 3 were each fixed between the cutting edges 2 of a pair of upper and lower cutting dies 1, i.e., the cutting edges 2 of the adjacent cutting dies 1 were in contact with only the regions on both sides of and close to the portion to be cut 4. Then, two adjacent pairs of upper and lower cutting dies 1 on both sides of the portion to be cut 4 were moved perpendicularly to the electrode sheet 3 in opposite directions (upward and downward). Thus, the electrode sheet 3 was cut at the portion to be cut 4, resulting in nickel electrode plates having a width of 50 mm and length of 100 mm.

EXAMPLE 4

In this example, the same spongy three-dimensional porous nickel metal body as that in Example 1 was used as a substrate, which was filled with an active material in the same manner as Example 1. Then, a 5 mm wide coating of resin solution was applied to the portions on both faces of the substrate to be cut. After the resin solution was impregnated into the substrate, it was heated at a temperature of 90° C. and dried. The resin solution applied was prepared by dissolving 10 weight % of polyethylene-polyvinyl alcohol copolymer in the mixture of 58 weight % of n-propanol and 32 weight % of water. The viscosity of the resin solution was about 100 mPa·s. The substrate was pressed so that the whole thickness was 0.5 mm, resulting in an electrode sheet 3.

Next, like Example 3, the regions on both sides of and close to a portion to be cut 4 of the electrode sheet 3 were each fixed between the cutting edges 2 of a pair of upper and lower cutting dies 1. Thus, the electrode sheet 3 was cut, resulting in nickel electrode plates having a width of 50 mm and length of 100 mm.

EXAMPLE 5

In this example, the same spongy three-dimensional porous nickel metal body as that in Example 1 was used as a substrate, which was formed so as to have a thin region 5 in the same manner as Example 2. Then, the substrate was filled with a paste active material. The resin film used in Example 3 was welded on both faces of the thin region 5. The substrate was pressed so that the whole thickness was 0.5 mm, resulting in an electrode sheet 3. The electrode sheet 3 was cut in the same manner as Example 3, resulting in nickel electrode plates having a width of 50 mm and length of 100 mm.

EXAMPLE 6

In this example, the same spongy three-dimensional porous nickel metal body as that in Example 1 was used as a substrate, which was filled with an active material in the same manner as Example 1. Then, a resin solution was applied to the portions on both faces of the substrate to be cut and dried, like Example 4. The portions coated with the resin solution were pressed together into a thin region having a thickness of 0.2 mm. The substrate was pressed so that the whole thickness was 0.5 mm, resulting in an electrode sheet 3. The electrode sheet 3 was cut in the same manner as Example 3, resulting in nickel electrode plates having a width of 50 mm and length of 100 mm.

The nickel electrode plates provided in each of Examples 3 to 6, a known separator, and known negative electrode plates made of misch metal-nickel based hydrogen storage alloy were used to produce an electrode group in the same manner as Example 1.

Short-circuit tests were conducted on the electrode group by measuring its resistance under a load of 300 kg·f (2,940N), which was substantially equal to the pressure to which the electrode group was subjected when it was incorporated in a battery. For Comparative Examples 4, 5, 6, and 7, the same short-circuit tests were conducted on electrode groups produced in the same manner as Example 1. Each of the electrode groups included the nickel electrode plates provided in the following manner: the electrode sheets 3 of Examples 3, 4, 5, and 6 were used for Comparative Examples 4, 5, 6, and 7, respectively; the entire regions on both sides of a portion to be cut 4 of the electrode sheet 3 were each fixed between a pair of upper and lower flat cutting dies having the same area as an electrode plate, and thus the electrode sheet 3 was cut, resulting in nickel electrode plates. The following Table 3 shows the difference in frequency of short circuits between the electrode groups including the nickel electrode plates manufactured by methods of Examples 3 to 6 and those including the nickel electrode plates manufactured by methods of Comparative Examples 4 to 7.

TABLE 3

|  | Cutting portion thickness (mm) | Electrode sheet thickness (mm) | Number of electrode groups tested | Number of electrode groups short-circuited | Proportion of short circuits (%) |
| --- | --- | --- | --- | --- | --- |
| Example 3 | 0.50 | 0.50 | 10,000 | 10 | 0.1 |
| Example 4 | 0.50 | 0.50 | 10,000 | 30 | 0.3 |
| Example 5 | 0.20 | 0.50 | 10,000 | 5 | 0.05 |
| Example 6 | 0.20 | 0.50 | 10,000 | 10 | 0.09 |
| Comparative Example 4 | 0.50 | 0.50 | 10,000 | 70 | 0.7 |
| Comparative Example 5 | 0.50 | 0.50 | 10,000 | 90 | 0.9 |

TABLE 3-continued

|  | Cutting portion thickness (mm) | Electrode sheet thickness (mm) | Number of electrode groups tested | Number of electrode groups short-circuited | Proportion of short circuits (%) |
|---|---|---|---|---|---|
| Comparative Example 6 | 0.20 | 0.50 | 10,000 | 60 | 0.6 |
| Comparative Example 7 | 0.20 | 0.50 | 10,000 | 70 | 0.7 |

As can be seen from Table 3, the short-circuit frequency of the electrode groups including the nickel electrode plates of Examples 3 and 4 was low, 0.1% and 0.3%, respectively. Moreover, the short-circuit frequency of the electrode groups including the nickel electrode plates of Examples 5 and 6, each of which employed the combination of forming a thin region and coating a resin film or impregnating a resin solution, was further reduced, 0.05% and 0.09%, respectively.

On the other hand, like Comparative Examples 4 to 7, even if the same electrode sheets 3 as those in Examples 3 to 6 were used, the short-circuit frequency was increased when the nickel electrode plates were provided in such a manner that the electrode sheet 3 was cut with the adjacent cutting dies being in contact with the entire regions on both sides of the portion to be cut 4. The reason for the difference in frequency of short circuits was considered to be as follows: When the electrode sheet 3 was cut with the cutting edges 2 of the adjacent cutting dies 1 being in contact with only the regions on both sides of and close to the portion to be cut 4, like Examples 3 to 6, fragments were difficult to be pressed on the surface of a nickel electrode plate by the cutting dies 1, thus preventing burrs from being generated as well.

EXAMPLE 7

In this example, first, 100 parts by weight of hydrogen storage alloy was mixed with 10 parts by weight of yttrium oxide and 10 parts by weight of styrene butadiene rubber. To this was added water as a dispersion medium so as to account for 15 weight % of the total paste, which then was kneaded into an active material in paste form.

The paste active material thus prepared was placed in a tank. A filling nozzle connected to the tank was opposed to a nickel core material, which was in the form of punching metal, having a width of 110 mm, length of 210 mm, thickness of 0.1 mm, porosity of 30%, and average pore size of 1 mm. While feeding the nickel core material in the longitudinal direction thereof, the paste active material was applied thereto. In this case, the filling nozzle applied a certain amount of active material, 13 to 15 g/sheet, to the nickel core material. Also, in this case, the nickel core material had a 5.0 mm wide plain region corresponding to a portion to be cut 4 of an electrode sheet 3 and its periphery, where no active material was applied. Thereafter, the nickel core material was pressed so that the whole thickness was 0.40 mm, resulting in the electrode sheet 3.

Next, as shown in FIGS. 1 and 2, the regions on both sides of and close to the portion to be cut 4 of the electrode sheet 3 were each fixed between the cutting edges 2 of a pair of upper and lower cutting dies 1, i.e., the cutting edges 2 of the adjacent cutting dies 1 were in contact with only the regions on both sides of and close to the portion to be cut 4. Then, two adjacent pairs of upper and lower cutting dies 1 on both sides of the portion to be cut 4 were moved perpendicularly to the electrode sheet 3 in opposite directions (upward and downward). Thus, the electrode sheet 3 was cut at the portion to be cut 4, resulting in electrode plates of hydrogen storage alloy having a width of 50 mm and length of 100 mm.

Next, the electrode plate of hydrogen storage alloy, the nickel electrode plate provided in the same manner as Example 1, and a known separator were used to produce an electrode group in the same manner as Example 1.

Short-circuit tests were conducted on the electrode group by measuring its resistance under a load of 300 kg·f (2,940N). For Comparative Example 8, the same short-circuit tests were conducted on an electrode group having the same configuration as that in this example, except for the use of hydrogen storage alloy electrode plates provided in the following manner: the entire regions on both sides of a portion to be cut 4 of an electrode sheet 3 were each fixed between a pair of upper and lower flat cutting dies having the same area as an electrode plate, i.e., the adjacent flat cutting dies were in contact with the entire regions on both sides of the portion to be cut 4; two adjacent pairs of upper and lower cutting dies on both sides of the portion to be cut 4 were moved perpendicularly to the electrode sheet 3 in opposite directions (upward and downward), and thus the electrode sheet 3 was cut. The following Table 4 shows the difference in frequency of short circuits between the electrode group including the hydrogen storage alloy electrode plates manufactured by a method of this example and that including the hydrogen storage alloy electrode plates manufactured by a method of Comparative Example 8.

TABLE 4

|  | Number of electrode groups tested | Number of electrode groups short-circuited | Proportion of short circuits (%) |
|---|---|---|---|
| Example 7 | 10,000 | 10 | 0.1 |
| Comparative Example 8 | 10,000 | 120 | 1.2 |

As can be seen from Table 4, the short-circuit frequency of the electrode group including the hydrogen storage alloy electrode plates of Comparative Example 8 was 1.2%. On the other hand, the short-circuit frequency of the electrode group including the hydrogen storage alloy electrode plates of this example was reduced to 0.1%. The reason for this was considered to be as follows: Even if the punching metal core material was used for the electrode sheet 3, the adhesion of foreign materials to the electrode plate surface occurred when the electrode sheet 3 was cut with the adjacent cutting dies being in contact with the entire regions on both sides of the portion to be cut 4, like Comparative Example 8. However, in this example, the plain region corresponding to the portion to be cut 4 of the electrode sheet 3 and its periphery, where no active material was applied, was provided, and the electrode sheet 3 was cut with the cutting edges 2 of the adjacent cutting dies 1 being in contact with only the plain regions on both sides of and close to the portion to be cut 4. Thus, it was possible to reduce the adhesion of foreign materials to the electrode plate surface and to prevent burrs from being generated on the surface of the hydrogen storage alloy electrode plate.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for manufacturing an electrode plate for a battery comprising:

cutting an electrode sheet containing an active material to a predetermined size with cutting dies, wherein only regions on both sides of and close to a portion of the electrode sheet to be cut are each fixed between a pair of cutting dies leaving regions on both sides of the sheet not fixed between the dies; two adjacent pairs of cutting dies on both sides of the portion to be cut are moved perpendicularly to the electrode sheet in opposite directions to each other, and thus the electrode sheet is cut.

2. The method according to claim 1, wherein the portion of the electrode sheet to be cut and the regions on both sides of and close to that portion are formed previously so as to have a thickness smaller than that of the electrode sheet body, and when the electrode sheet is cut, the thin regions on both sides of the portion to be cut are each fixed between the pair of cutting dies.

3. The method according to claim 2, wherein the thickness of the thin region is one-half to one-fifth of that of the electrode sheet body.

4. The method according to claim 2, wherein the portion of the electrode sheet to be cut and the regions on both sides of and close to that portion are formed to be thin by pressing.

5. The method according to claim 1, wherein the electrode sheet is formed by filling a substrate of three-dimensional porous metal body with the active material.

6. The method according to claim 1, wherein the electrode sheet is formed by filling a substrate of three-dimensional porous metal body with the active material, and the regions on both sides of and close to the portion of the electrode sheet to be cut are coated with resin or impregnated with a liquid containing a resin component before cutting the electrode sheet.

7. The method according to claim 6, comprising the following steps in no special order before cutting the electrode sheet:

a step of coating the regions on both sides of and close to the portion of the electrode sheet to be cut with resin or a step of impregnating the regions with a liquid containing a resin component, and a step of forming the portion of the electrode sheet to be cut and the regions on both sides of and close to that portion so as to have a thickness smaller than that of the electrode sheet body.

8. The method according to claim 1, wherein the electrode sheet is formed by applying the active material to a core material of punching metal, a region to which no active material is applied is provided previously in the portion of the electrode sheet to be cut and the regions on both sides of and close to that portion, and when the electrode sheet is cut, the regions with no active material on both sides of the portion to be cut are each fixed between the pair of cutting dies.

9. The method according to claim 1, wherein the width of the fixed regions is within about ¹⁄₁₀ of the width and ¹⁄₂₀ of the length of the resulting electrode plate.

* * * * *